(12) United States Patent
Fukuchi

(10) Patent No.: US 6,999,143 B2
(45) Date of Patent: Feb. 14, 2006

(54) COLOR LIQUID CRYSTAL DISPLAY DEVICE AND METHOD OF MANUFACTURING THE SAME, AND METHOD OF MANUFACTURING A COLOR FILTER SUBSTRATE

(75) Inventor: Takakazu Fukuchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 4 days.

(21) Appl. No.: 10/793,282

(22) Filed: Mar. 4, 2004

(65) Prior Publication Data

US 2004/0183971 A1 Sep. 23, 2004

(30) Foreign Application Priority Data

Mar. 11, 2003 (JP) .............................. 2003-065280
Feb. 10, 2004 (JP) .............................. 2004-033142

(51) Int. Cl.
*G02F 1/1335* (2006.01)
(52) U.S. Cl. ..................................................... 349/114
(58) Field of Classification Search ................. 349/114
See application file for complete search history.

(56) References Cited

U.S. PATENT DOCUMENTS

| | | | |
|---|---|---|---|
| 6,697,138 B2 * | 2/2004 | Ha et al. | 349/114 |
| 6,788,367 B2 * | 9/2004 | Chang et al. | 349/114 |
| 2005/0057710 A1 * | 3/2005 | Lin | 349/114 |

* cited by examiner

*Primary Examiner*—James A. Dudek

(74) *Attorney, Agent, or Firm*—Adams & Wilks

(57) ABSTRACT

To provide a semi-transmissive type color liquid crystal display device that is capable of realizing high color reproducibility as well as increase in reflection brightness upon light transmission and upon light reflection. In display pixel elements of a color filter substrate used in the semi-transmissive type color liquid crystal display device, a color filter layer formed on a reflection part is thin and a color filter layer formed on a transmission part is thick, and a thickness of a metallic reflective film formed on the reflection part is set to 0.2 $\mu$m or more. Further, the color layer filter at the transmission part and the color layer filter at the reflection part are formed at the same time, and a continuous color filter layer is obtained.

5 Claims, 5 Drawing Sheets

FIG. 9
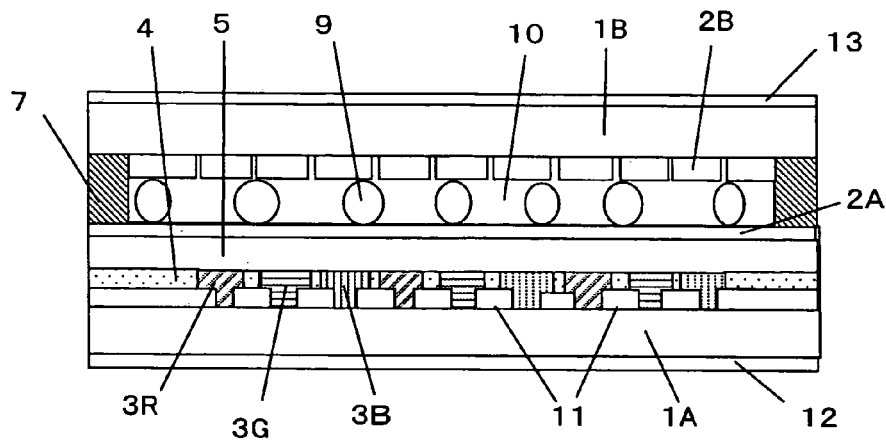
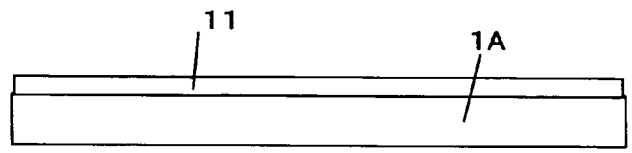
FIG. 10A
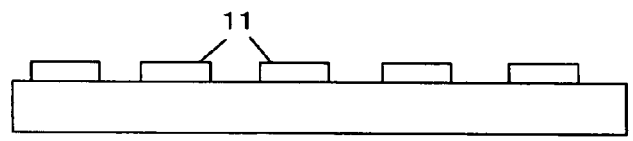
FIG. 10B
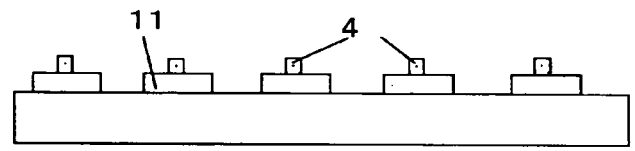
FIG. 10C
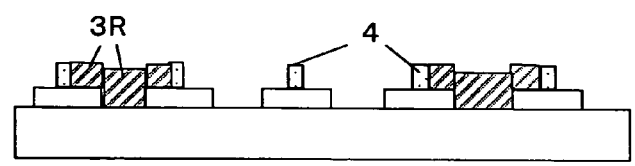
FIG. 10D
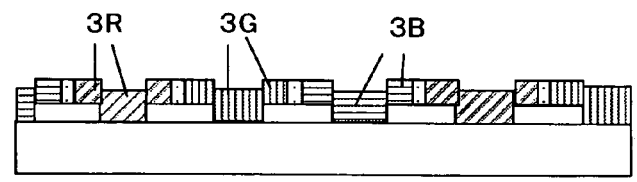
FIG. 10E
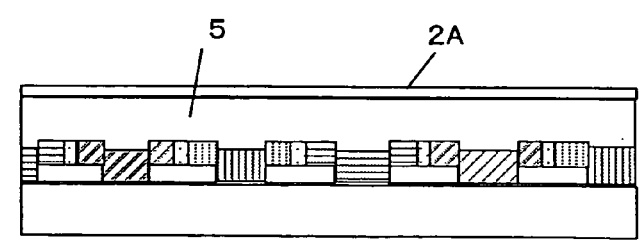
FIG. 10F

COLOR LIQUID CRYSTAL DISPLAY DEVICE AND METHOD OF MANUFACTURING THE SAME, AND METHOD OF MANUFACTURING A COLOR FILTER SUBSTRATE

BACKGROUND OF THE INVENTION

1. Field of the Invention

The present invention relates to a color liquid crystal display device used in a portable information device such as a mobile phone or an electronic notebook, a personal computer, or the like. In particular, the invention relates to a semi-transmissive type color liquid crystal display device serving both as a reflection type color liquid crystal display device and a transmission type color liquid crystal display device, a method of manufacturing the same, and a method of manufacturing a color filter substrate.

2. Description of the Related Art

As a color liquid crystal display device used for a display device in a mobile phone, a portable information device, or the like, three types: a transmission type, a reflection type, and a semi-transmissive type of color liquid crystal display devices are used. Hereinafter, brief description will be made of the three types of conventional color liquid crystal display devices with reference to the accompanying drawings. FIG. 1 is a sectional view of a conventional transmission type color liquid crystal display device. A light shielding film 4 and color filters 3 are formed on the surface of a lower transparent substrate 1A. The color filter 3 includes colored portions of three primary light colors: red (R), green (G), and blue (B) according to a pattern. That is, the colored portions of red, green, and blue are formed in the color filter 3 in an arbitrary pattern such as a stripe or a mosaic. The light shielding film 4 is provided between the colored portions as appropriate. A transparent flattening film 5 is provided on the surfaces of the light shielding film 4 and the color filters 3, and on top of the flattening film a transparent electrode 2A is formed in an arbitrary pattern. In the case of a passive type color liquid crystal display device, the transparent electrode 2A is formed in such a pattern that the transparent electrode crosses colored layers 3R, 3G, and 3B of the color filters. That is, the transparent electrode 2A is formed as a common line. In the case of an active type color liquid crystal display device, the transparent electrode 2A is not patterned, and may be left as it is in an electrode shape after performing film formation by using a film formation mask. Those layers are collectively referred to as a color filter substrate 6.

As shown in the drawing, a gap between the color filter substrate 6 and a transparent substrate 1B as a counter substrate is uniformly maintained by sealing members 7 and spacers 9, and a liquid crystal 10 is filled in a space defined by the color filter substrate 6 and the transparent substrate 1B. A display panel thus structured is sandwiched between a pair of deflection plates 12 and 13. In addition, orientation films (not shown) are provided on the surfaces of transparent electrodes (2A and 2B) (see Tatsuo Uchida (Nov. 1, 1994) "New Technology of Liquid Crystal Display", p. 167–174, published by Kogyochosakai Publishing Co., Ltd., for instance).

FIG. 2 is a sectional view of a conventional reflection type color liquid crystal display device. The aforementioned description of the transmission type color liquid crystal display device of FIG. 1 will be omitted. As shown in FIG. 2, a metallic reflective film 11 for reflecting outside light is provided between the transparent substrate 1A and the color filters 3. Therefore, the deflection plate 12 becomes unnecessary unlike the transmission type display device shown in FIG. 1. In this case, the deflection plate 13 is often provided with a quarter-wave plate for returning phase-shifted light due to reflection at the metallic reflective film 11 and a layer having a scattering function for glare prevention of regularly reflected light at the metallic reflective film 11 (see Tatsuo Uchida (Nov. 1, 1994) "New Technology of Liquid Crystal Display", p. 167–174, published by Kogyochosakai Publishing Co., Ltd., for instance).

FIG. 3 is a sectional view of a conventional semi-transmissive type color liquid crystal display device. The above-mentioned description regarding the color liquid crystal display devices will be omitted. As shown in FIG. 3, the metallic reflective film 11 formed between the transparent substrate 1A and color filters 3 is partially removed. Therefore, both functions of a reflection part and a transmission part are achieved in one pixel element. Further, the deflection plate 12 is provided on the outer side surface of the transparent substrate 1A (see JP 11-52366 A (pages 2–4, FIG. 1), for instance).

Subsequently, brief description will be made of a method of manufacturing the conventional semi-transmissive type color liquid crystal display device. First of all, as shown in FIG. 4A, the metallic reflective film 11 is formed on the surface of the transparent substrate 1A by a vacuum film formation method such as sputtering or a vacuum deposition method so as to have the thickness at a level in which no light is transmitted therethrough. To obtain sufficient light shielding property, the thickness of the metallic reflective film 11 needs to be 0.10 μm or more. In the case where the metallic reflective film 11 is made of aluminum or an aluminum alloy, the thickness thereof is set to approximately 0.125 μm in general. In the case where the metallic reflective film 11 is made of silver or a silver alloy, the thickness thereof is generally set to about 0.10 μm. Next, as shown in FIG. 4B, the metallic reflective film 11 is patterned by a photolithography method. Patterning is conducted such that the reflection part and the transmission part are established in each pixel element in a display screen of the display panel. In FIG. 4B, a part where the metallic reflective film 11 is left corresponds to the reflection part, and a part where the metallic reflective film 11 is removed becomes the transmission part. The proportion of the reflection part and the transmission part can be set arbitrarily through patterning.

Then, as shown in FIG. 4C, the patterned light shielding film 4 is formed. To obtain the light shielding film 4, the entire surface of the transparent substrate 1A is applied with a liquid photoresist containing black pigments, and thereafter the resist is patterned into a desired shape by the photolithography method. Typically, this is called a black matrix as being formed in a matrix. In these days, to increase the reflection light amount of the color liquid crystal display device, the light shielding film 4 is formed into a stripe shape (black stripe), or sometimes the light shielding film 4 is provided only in a frame part around the color liquid crystal display device and not provided in its display area.

Subsequently, as shown in FIG. 4D, the colored portions 3R constituting the color filters are formed. To obtain red color filters, the entire surface of the transparent substrate 1A is applied with a liquid photoresist containing red pigments, and the resist is then patterned into a desired shape by the photolithography method. The colored portions are usually formed in a stripe shape along the matrix of the light shielding film 4. In a similar manner, the colored layers 3G (green) and 3B (blue) are sequentially formed to obtain such a shape as shown in FIG. 4E. Here, there is almost no difference between the thickness of the respective colored layers 3R, 3G, and 3B obtained through the application of the liquid color resist on the metallic reflective film 11 (that is, at the reflection part) and the thickness of the respective colored layers 3R, 3G, and 3B on the transparent substrate 1A where the metallic reflective film 11 is removed (that is, at the transmission part). This is because the metallic reflective film 11 is a thin film having the thickness of approximately 0.10 μm, and the liquid photoresist is turned into a film along the surface shape of the substrate 1A.

Next, as shown in FIG. 4F, the flattening film 5 made of a transparent resin is formed on the surfaces of the color filters 3 in which those colored portions are formed. In general, the flattening film 5 is formed through application of a liquid material by use of a spinner. As shown in FIG. 4G, the transparent electrode 2A is sequentially formed on the surface of the flattening film 5. The flattening film 5 has adhesiveness with respect to the transparent electrode 2A, resistance to patterning, and the like. The transparent electrode 2A is typically formed by a sputtering method so as to have desired thickness and resistance value characteristics. In general, a conductive material containing an incompletely oxidized alloy of indium (In) and tin (Sn) is used for forming the transparent electrode 2A.

In this way, the substantially planer color filter substrate 6 shown in FIG. 4H is completed. As described above, by using the color filter substrate 6, the conventional semi-transmissive type color liquid crystal display device is formed. Hereinafter, brief description will be made of a method of manufacturing a liquid crystal display device. Orientation films provided on the surfaces of the color filter substrate 6 and a counter substrate 8 are commonly formed by an offset printing method. The spacers 9 provided between the color filter substrate 6 and the counter substrate 8 are uniformly distributed by a dispersion method. The sealing members 7 are formed by a screen printing method in usual cases. The color filter substrate 6 and the counter substrate 8 are glued together, and after that the liquid crystal 10 is filled in the space corresponding to the gap between the color filter substrate 6 and the counter substrate 8.

Further, recently, there has come along a technique for improving color reproducibility at the time of light transmission by increasing the thickness of the color filter at the transmission part as compared to the thickness of the color filter at the reflection part (see JP 2002-303861 A (pages 2–4, FIG. 1), for instance). Brief description will be made of the technique by referring to FIGS. 5A to 5G and 6. First, as shown in FIG. 5A, the surface of the transparent substrate 1A is applied with a photosensitive transparent resin, and resin layers 14 are formed by the photolithography method. To obtain the resin layers 14, a considerably complicated method is adopted as follows. That is, a positive type photoresist having a property of melt flow upon post-baking is formed in a desired pattern, and then projections and depressions are formed on the layer surface by post-baking. After that, application of the positive type photoresist is conducted again to cover the projections and depressions. Thus, the photolithography method is used twice by way of double photoresist applications (see JP 6-11711 A (pages 2 and 3, FIG. 4), for instance). As in the pattern of the metallic reflective film 11 described in the case of the above-mentioned conventional semi-transmissive type color liquid crystal display device, the resin layers 14 have a shape in which the reflection part and the transmission part are established in one pixel element. Next, the metallic reflective film 11 is formed on the entire surface of the transparent substrate 1A by sputtering or the like, and then the film is patterned by the photolithography method to have such a pattern that the metallic reflective film 11 overlaps the surfaces of the resin layers 14. After that, as shown in FIG. 5C, the light shielding film 4 is formed. To obtain the colored portions of the color filters, red colored portions 3R and 3R2, green colored portions 3G and 3G2, and blue colored portions 3B and 3B2 are formed by employing the photolithography method six times with negative type color resists for the reflection part and the transmission part, separately (FIGS. 5D to 5F). As described above, by using the color filter substrate 6, another conventional semi-transmissive type color liquid crystal display device shown in FIG. 6 is obtained.

As another method of forming a color filter, there is also disclosed in JP 2002-303861 A (pages 2–4, FIG. 1) a method of forming color filters at the reflection part and the transmission part at the same time. However, no description is given of a specific method of doubling the thickness of the color filter at the transmission part as compared to the thickness of the color filter at the reflection part, and it is merely described that "application is performed so as to have the thickness" in the transmission area twice as large as the thickness in the reflection area. The inventors of the present invention can understand that the thickness at the reflection part and that on the transmission part are changed in employing the photolithography method six times as described above, but conceive that it is not easy to understand the method of "forming color filters at the reflection part and the transmission part at the same time", which offers no specific description.

As described above while referring to FIGS. 5A to 5G and 6, in order to achieve a satisfactory color balance upon light reflection and transmission, the semi-transmissive type color liquid crystal display device having the thickness at the transmission part larger than the thickness at the reflection part has been devised. However, such a semi-transmissive type color liquid crystal display device has the following problem. That is, since the colored portions of the respective colors in the color filters are formed by performing a photolithography step one time each, the color filters 3 having substantially the same thickness are formed in any of the display areas. Accordingly, levels of color density and brightness achieved by the respective color filters are the same in the entirety of the display area. In addition, from the relationship regarding productivity of the reflective film 11, the thickness thereof is set to about 0.10 μm, and the colored portions are formed on the reflective film 11 through a spinner method by using the liquid color resist, so that there is almost no difference in film thickness at the reflection part and the transmission part. Therefore, there is also almost no difference in color density and brightness achieved by the color filters at the entirety of the display area. In other words, if the film thickness of the color filter is increased to enhance display color density of the semi-transmissive type color liquid crystal display device, transmittance of the color filter is lowered, which leads to a problem of decrease in brightness at the transmission part and the reflection part. Conversely, if the film thickness of the color filter is decreased with the emphasis on brightness at the display image, there is a problem in that the display color density cannot sufficiently be obtained. Moreover, at the reflection part, outside light is transmitted through the color filter layer and thereafter reflected at the metallic reflective film, and the reflected light returns while being transmitted through the color filter layer again. Thus, the incident light amount is drastically reduced because of the light transmission through the color filter layer twice. For this reason, there is a problem in that visibility of the color liquid crystal display device deteriorates.

Further, in addition to this structure, it is conceivable to provide a structure in which after forming color filters having small thickness, color filters are further formed only at the transmission part 12. However, in this structure, the number of times to perform the photolithography step for the color filters needs to be doubled, i.e., six times, resulting in lowering productivity and increasing industrial and economic burdens such as increase in the number of defects. In the case of the color filters used for the color liquid crystal display device having a refined color filter shape, since high-precision alignment by the above-mentioned photolithography method is required, it is necessary to perform an extremely troublesome manufacturing step. At the same time, productivity severely deteriorates and also yield is lowered so that industrial and economic problems are unavoidable.

Note that, the inventors of the present invention point out that the extremely troublesome method of forming the resin layers 14 is a prerequisite also for the method of setting the thickness of the color filter at the transmission part larger than that of the color filter at the reflection part through the simultaneous formation of the color filters, which is disclosed in JP 2002-303861 A (pages 2–4, FIG. 1).

SUMMARY OF THE INVENTION

The present invention has been made with a focus on the above-mentioned problems inherent in the semi-transmissive type color liquid crystal display device described above. An object of the present invention is to provide a color liquid crystal display device that is capable of realizing high color reproducibility as well as increase in reflection brightness upon light transmission and upon light reflection. Another object of the present invention is to provide a method of manufacturing the color liquid crystal display device. In addition, still another object of the present invention is to provide a method of manufacturing a color filter substrate.

According to the present invention, there is provided a color liquid crystal display device, in which, in display pixel elements, a thickness of a color filter layer provided on a reflection part is small and a thickness of the color filter layer provided on a transmission part is large, and a thickness of a metallic reflective film formed on the reflection part is set to 0.2 $\mu$m or more. Also, in the color liquid crystal display device according to the present invention, the metallic reflective film is provided in a part of an area of the display pixel element to establish a reflection part and a transmission part in the display pixel element; colored layers are integrally provided on the metallic reflective film and at the transmission part where the metallic reflective film is not provided in the display pixel element; and a sum of a thickness of the metallic reflective film and a thickness of the colored layer on the metallic reflective film is larger than a thickness of the colored layer at the transmission part. Further, the sum of the thickness of the metallic reflective film and the thickness of the colored layer on the metallic reflective film is larger than the thickness of the colored layer at the transmission part by 0.15 $\mu$m to 0.30 $\mu$m.

Also, a color liquid crystal display device according to the present invention, includes: a color filter substrate having a metallic reflective film, colored layers, and a transparent electrode formed on a transparent substrate; a counter substrate having an opposite electrode that is opposite to the transparent electrode and constitutes a display pixel element with the transparent electrode; and a liquid crystal layer formed between the color filter substrate and the counter substrate, in which the metallic reflective film having a thickness of 0.2 $\mu$m or more is formed on a part of an area of the display pixel element; and the colored layers are integrally formed on the metallic reflective film and at an area where the metallic reflective film is not formed in the display pixel element.

Further, a light shielding film is provided between the colored layers. The light shielding film is provided on the metallic reflective film or on an area of the transparent substrate where the metallic reflective film is not formed.

Also, a method of manufacturing a color liquid crystal display device according to the present invention, includes: establishing a reflection part and a transmission part by forming a metallic reflective film having a thickness of 0.2 $\mu$m or more on a part of an area of a transparent substrate where the display pixel element is to be constituted; forming colored layers at the reflection part and the transmission part at the same time; forming a color filter substrate by repeatedly performing the colored layer formation for each color; forming the transparent electrode having a predetermined pattern on the color filter substrate; forming the opposite electrode having a predetermined pattern on the counter substrate; arranging the color filter substrate and the counter substrate such that the transparent electrode and the opposite electrode are opposed to each other; and forming the liquid crystal layer in a space between the transparent electrode and the opposite electrode.

Further, the method of manufacturing a color liquid crystal display device further includes: forming a light shielding film on a part of the metallic reflective film before the colored layer formation. Alternatively the method further includes: forming a light shielding film on a part of an area of the transparent substrate where the metallic reflective film is not formed before the colored layer formation. Also, during the colored layer formation, each of the colored layers is formed by supplying a liquid color resist in a predetermined area surrounded by the light shielding film. Further, after the supply of the liquid color resist, the resist is left to stand in a liquid state for 1 minute or longer before being dried.

Further, a thickness of the metallic reflective film is in a range from 0.4 $\mu$m to 0.6 $\mu$m. Also, a thickness of colored layers at the reflection part is in a range from 0.4 $\mu$m to 0.8 $\mu$m.

A method of manufacturing a color filter substrate according to the present invention, includes: establishing a reflection part and a transmission part by forming a metallic reflective film having a thickness of 0.2 $\mu$m or more on a part of a transparent substrate; forming colored layers at the reflection part and the transmission part at the same time; and forming a color filter by repeatedly performing the colored layer formation for each color. Further, during the colored layer formation, the colored layer on the metallic reflective film is formed to have a thickness in a range from 0.4 $\mu$m to 0.9 $\mu$m, and at the same time the colored layer at the transmission part is formed to have a thickness in a range from 0.55 $\mu$m to 1.0 $\mu$m.

As described above, by setting the thickness of the color filter at the reflection part different from that of the color filter at the transmission part, without any additional manufacturing step, it is possible to realize the color reproducibility upon light transmission at a competitive level with the color reproducibility upon light reflection as well as the increase in brightness upon light reflection. In addition, no manufacturing step is newly added, whereby industrial and economic losses such as yield deterioration are suppressed, and the method of manufacturing the high-quality and high-productivity but inexpensive semi-transmissive type color liquid crystal display device can be realized.

BRIEF DESCRIPTION OF THE DRAWINGS

In the accompanying drawings:

FIG. 9 is a sectional view of the semi-transmissive type color liquid crystal display device according to the embodiment of the present invention; and FIGS. 10A to 1OF show a method of manufacturing a semi-transmissive type color liquid crystal display device according to an embodiment of the present invention.

DETAILED DESCRIPTION OF THE PREFERRED EMBODIMENTS

Embodiment

Figure 1:
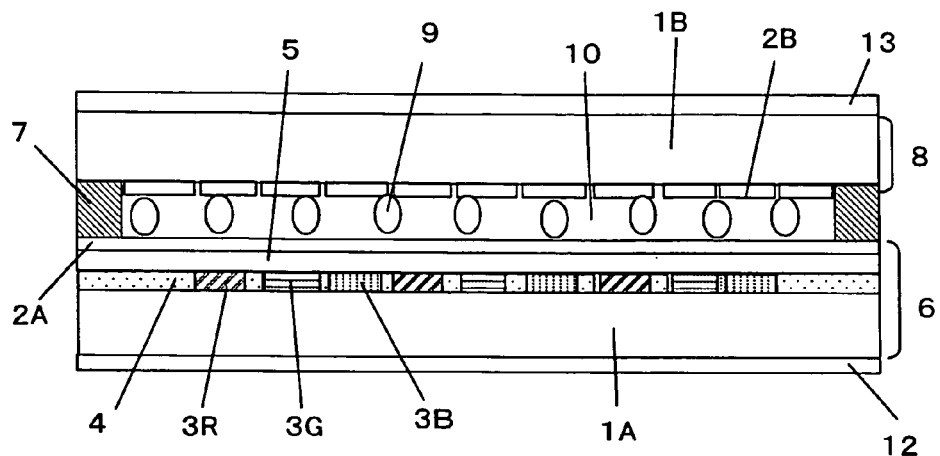
FIG. 1 is a sectional view schematically showing a structure of a conventional transmission type color liquid crystal display device.
Figure 2:
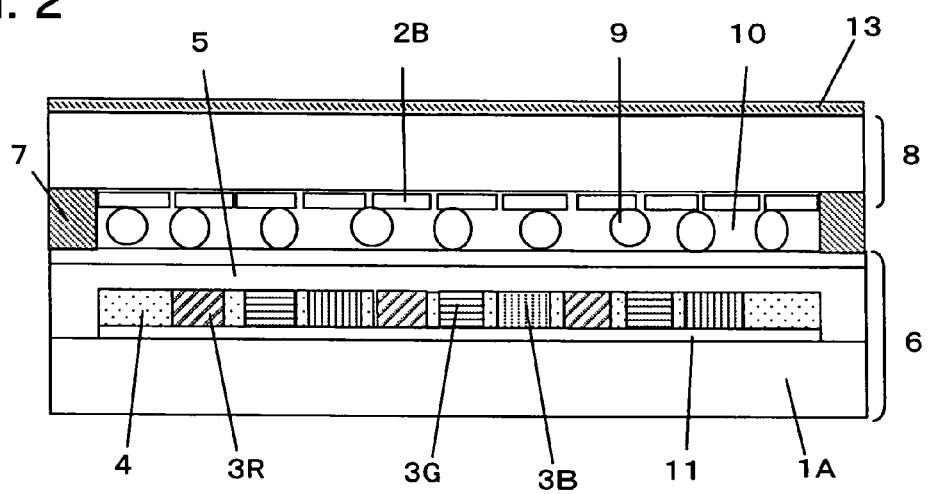
FIG. 2 is a sectional view of a conventional reflection type color liquid crystal display device.
Figure 3:
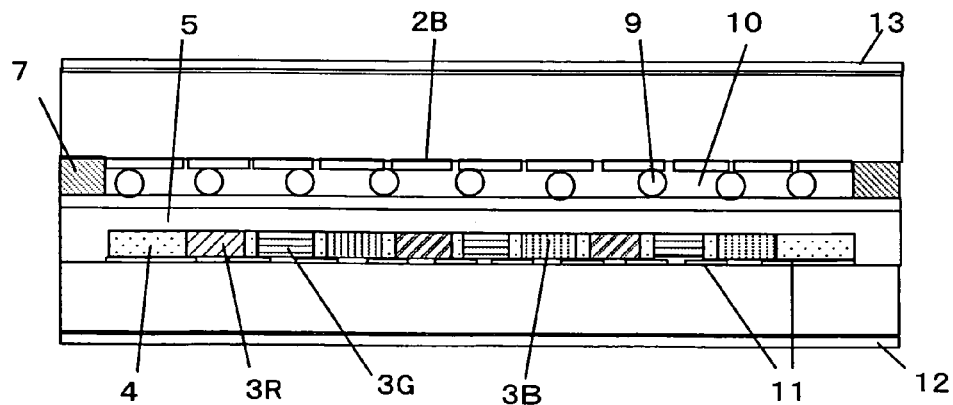
FIG. 3 is a sectional view of a conventional semi-transmissive type color liquid crystal display device.
Figure 4A:
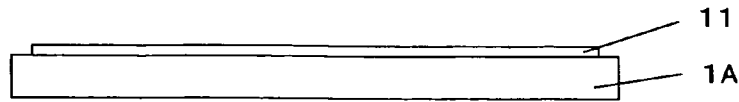
FIGS. 4A to 4H show a method of manufacturing a conventional semi-transmissive type color liquid crystal display device.
Figure 4B:
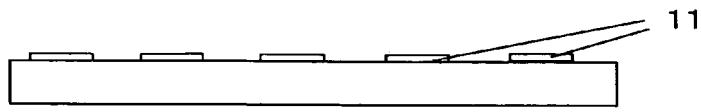
Figure 4C:
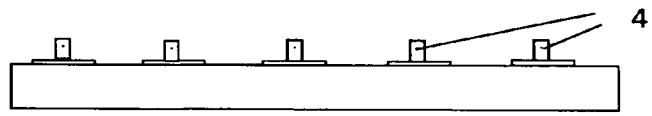
Figure 4D:
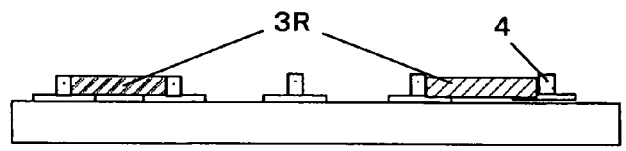
Figure 4E:
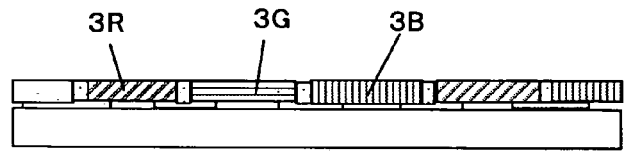
Figure 4F:
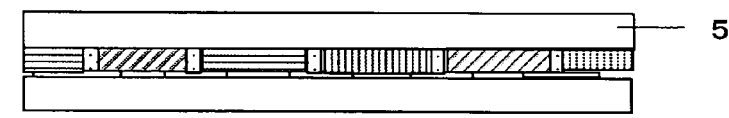
Figure 4G:
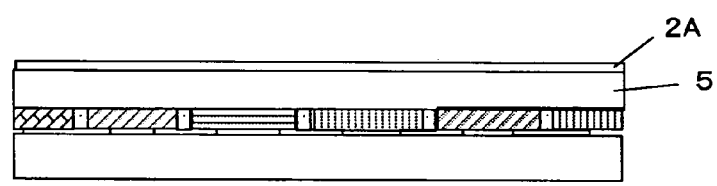
Figure 4H:
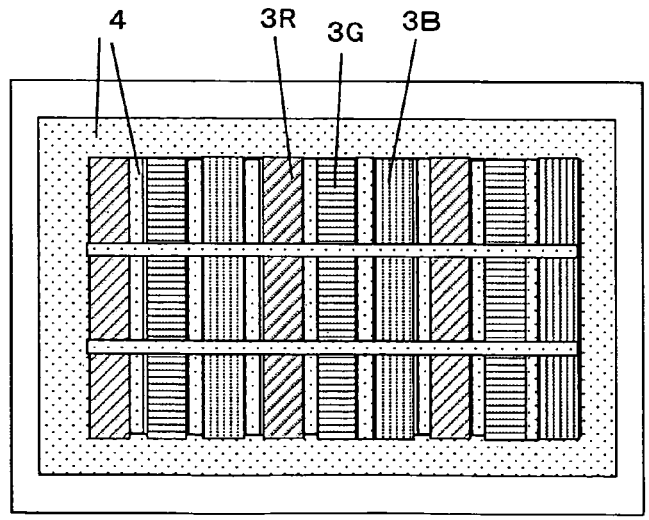
Figure 5A:
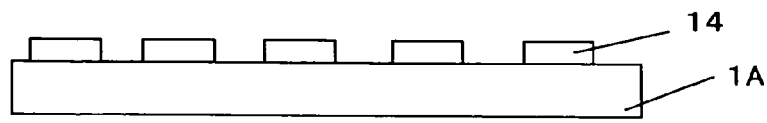
FIGS. 5A to 5G show a method of manufacturing another conventional semi-transmissive type color liquid crystal display device.
Figure 5B:
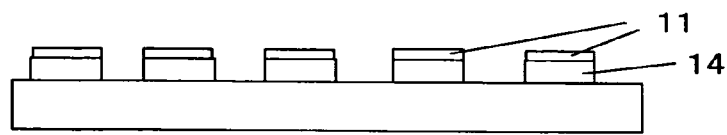
Figure 5C:
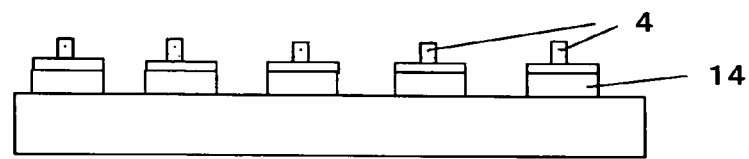
Figure 5D:
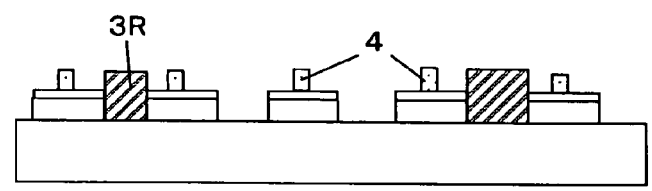
Figure 5E:
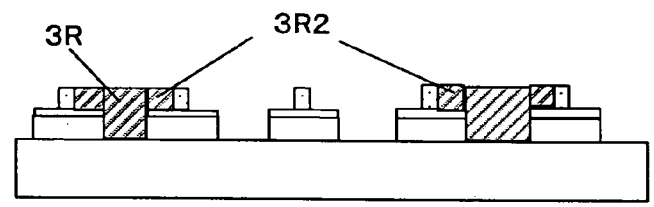
Figure 5F:
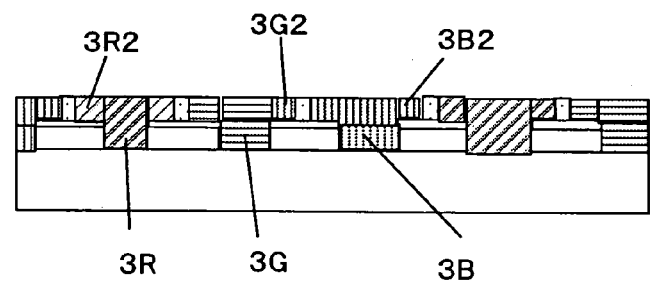
Figure 5G:
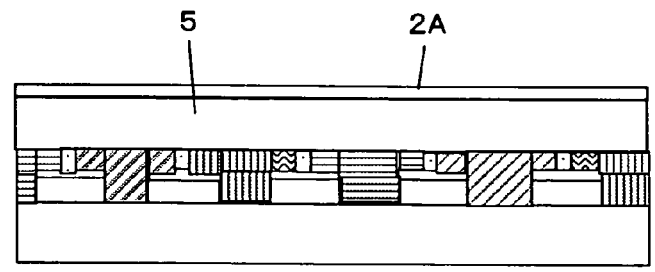
Figure 6:
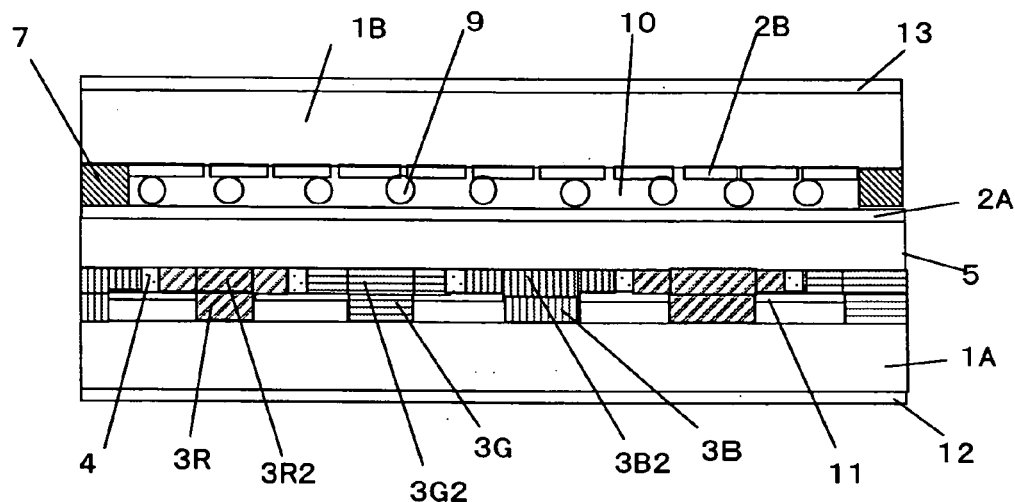
FIG. 6 is a sectional view of another conventional semi-transmissive type color liquid crystal display device.
Figure 7:
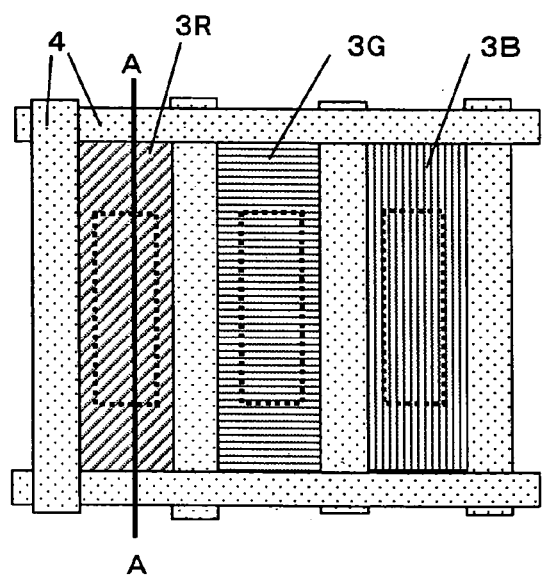
FIG. 7 is an enlarged view of a part of a semi-transmissive type color liquid crystal display device according to an embodiment of the present invention.
Figure 8:
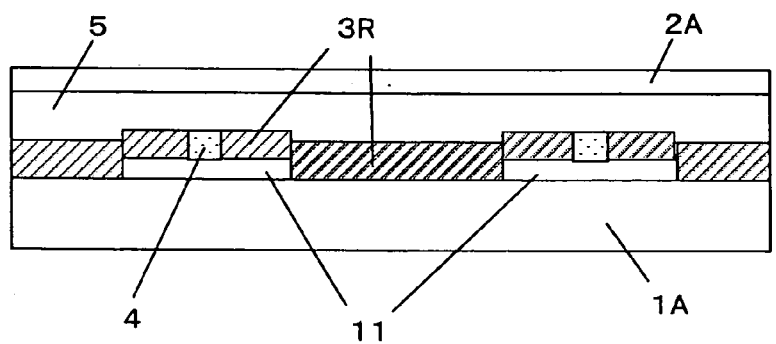
FIG. 8 is an enlarged view of a part of a semi-transmissive type color filter substrate of the present invention.

Hereinafter, description will be made of a semi-transmissive type color liquid crystal display device according to an embodiment of the present invention with reference to the drawings. FIG. 7 is an enlarged plan view showing a part of a pixel of a semi-transmissive type color liquid crystal display element. The figure shows that one pixel is composed of three pixel elements respectively having colored portions (R, G, and B) that constitute color filters. In addition, a light shielding film 4 is provided between each of the pixel elements. FIG. 8 schematically shows a cross sectional structure of a color filter substrate corresponding to a cross section taken along a line A—A in FIG. 7, that is, a cross section of the pixel element having red colored portions. As shown in the drawing, a metallic reflective film 11 and red colored layers 3R are provided on the surface of a transparent substrate 1A. In the pixel element, one colored layer 3R exists at a part as being provided on the metallic reflective film (reflection part) while the other colored layer 3R is present at another part as being provided on the transparent substrate without involving the metallic reflective film (transmission part). More specifically, a portion where an opening is provided in the metallic reflective film corresponds to the transmission part. In this embodiment, the colored layer at the transmission part and the colored layer at the reflection part are formed of a continuous layer. In addition, the light shielding film 4 is provided on a part on the metallic reflective film 11. The light shielding film 4 is formed in a matrix so as to surround display pixel elements. In order to improve the appearance of the display screen, the light shielding film 4 is formed also in an outer periphery of the entire display screen area, which is so-called a frame. On the surfaces of those films, a transparent resin layer is formed for flattening (hereinafter, referred to as transparent flattening film). Furthermore, a transparent conductive film 2A formed in a desired pattern by a photolithography method is provided on this transparent flattening film 5.

In usual cases, the thickness of the metallic reflective film 11 provided with openings in some areas so as to have a transmitting function is set to about 0.12 $\mu$m to 0.15 $\mu$m. This also corresponds to the thickness necessary for completely blocking light while eliminating a cause such as a pinhole that allows light to transmit in the metallic reflective film formed by a vacuum film formation method such as sputtering. In the present invention, the thickness of the metallic reflective film 11 is set to 0.2 $\mu$m or more and 1.0 $\mu$m or less. The larger the thickness of the metallic reflective film 11, the larger the film thickness of the colored layer at the transmission part. That is, the difference in film thickness of the colored layers at the transmission part and the reflection part can be increased. It is conceivable that this is because when a liquid color resist is applied for forming the colored layer, an effect for flattening surface projections and depressions is developed owing to the liquid state, in which the liquid color resist flows into opening areas (transmission parts) provided in the metallic reflective film. However, the completely flat state of the colored layers at the reflection part and the transmission part may not be achieved in some cases. The thickness at the transmission part (the thickness of the colored layer) is smaller than the thickness at the reflection part (the total thickness of the metallic reflective film and the colored layer). At this time, it is desirable to set appropriately the total thickness of the metallic reflective film and the colored layer such that this thickness difference falls in a range from approximately 0.15 $\mu$m to 0.30 $\mu$m. The larger the thickness at the reflection part (the total thickness of the metallic reflective film and the colored layer), the larger the thickness at the transmission part (the thickness of the colored layer). However, the increase in thickness at the transmission part is not as much as the increase in thickness at the reflection part. Consequently, the larger the thickness at the reflection part, the larger the level difference between the reflection part and the transmission part. The thickness at the reflection part is the total thickness of the metallic reflective film and the colored layer so that the total thickness can be adjusted by appropriately selecting the thickness of the metallic reflective film and the thickness of the colored layer individually.

Further, when the thickness of the metallic reflective film is larger, peeling or the like tends to occur due to increase in its internal stress, and therefore there is a possibility of lowering reliability. Thus, the thickness of the metallic reflective film is preferably 0.6 $\mu$m or less. On the other hand, to obtain optimal color density and brightness at the transmission part and the reflection part, a certain level of film thickness difference of colored layers is required, so that the metallic reflective film needs to have thickness to some extent as well. In view of the above, the thickness of the metallic reflective film is preferably in a range from 0.4 $\mu$m to 0.6 $\mu$m.

In addition, the film thickness of the colored layer provided on the metallic reflective film needs to be 0.4 $\mu$m or more to secure chromaticity and reproducibility at the time of reflection observation. On the other hand, in order that the thickness of the colored layer at the transmission part be set to 1.0 μm or less to secure brightness at the time of observation, after giving consideration to the above-mentioned level difference, it is preferred to set the total thickness to be in a range from 0.8 μm to 1.3 μm. Accordingly, the thickness of the colored layer at the reflection part (the colored layer on the metallic reflective film) is preferably in a range from 0.4 μm to 0.9 μm.

For example, in the case where the metallic reflective film had the thickness of 0.4 μm, and the thickness of the colored layer at the reflection part was in a range from 0.4 μm to 0.8 μm, that is, the total thickness at the reflection part was in a range from 0.8 μm to 1.2 μm, the thickness at the transmission part was in a range from 0.55 μm to 0.90 μm. Meanwhile, in the case where the metallic reflective film had the thickness of 0.4 μm, and the thickness of the colored layer at the reflection part was 0.4 μm, that is, the total thickness at the reflection part was 0.8 μm, the thickness at the transmission part was in a range from 0.55 μm to 0.65 μm.

Factors that enhance the above-mentioned flattening function of the liquid color resist include: the viscosity of a color resist; the retention time of the color resist in a liquid state from the application thereof on the transparent substrate 1A until being dried; the boiling point of an organic solvent used for the color resist; and the like. Although the viscosity of a commonly used color resist is in a range approximately from 5 cp to 15 cp, a resist with a low viscosity is preferably used in view of enhancing the flattening function. An organic solvent generally used for a color resist is a mixed solvent containing propylene glycol monomethyl ether acetate (PG-MEA) as its main ingredient and having the boiling point of about 140° C. The higher the boiling point, the more the flattening function enhances. In addition, the longer the time from the color resist application until pre-baking is performed, that is, a period of time for leaving the color resist to stand in a liquid state after the application, the more likely the color resist is to be flattened, which is preferable. The optimal time period may be varied depending on the viscosity of the color resist and the boiling point of the organic solvent used for the color resist, but the retention time of 1 minute or longer is necessary to flatten the color resist. There is however no point in leaving the color resist to stand until the organic solvent evaporates, so that the retention time is preferably from about 3 minutes to 10 minutes. Those factors respectively have correlations as well as restrictions, and thus considerations should be given in terms of quality and economical efficiency such as uniformity in film thickness of the color filters, workability, and productivity.

The present invention will be described further in detail by way of the following examples.

EXAMPLE 1

FIG. 9 shows a schematic sectional view of a semi-transmissive type color liquid crystal display device of this example. The metallic reflective film 11, which is provided with openings (transmission parts) in some parts, has the thickness of 0.5 μm, and is made of an aluminum alloy, is provided on the surface of the transparent substrate 1A. On the surfaces of the metallic reflective film 11 and its openings, the colored layers 3R, 3G, and 3B of the primary colors of red, green, and blue are formed. In this example, the film thickness of the colored layer at the reflection part is 0.6 μm and the film thickness of the colored layer at the transmission part is 0.9 μm. Therefore, the total thickness at the reflection part is 1.1 μm, which is the total thickness of the 0.5 μm-thick metallic reflective film 11 and the 0.6 μm-thick colored layer. On the other hand, the total thickness at the transmission part simply equals to the film thickness of the colored layer, which is 0.9 μm. Accordingly, the level difference between the reflection part and the transmission part is 0.2 μm. The level difference is formed in the same manner in all the colored layers 3R, 3G, and 3B. In a periphery of the display pixel elements of the colored layers 3R, 3G, and 3B, the light shielding film 4 having the thickness of 0.6 μm is formed in a matrix on the surface of metallic reflective film 11. On the surfaces of the colored layers 3R, 3G, and 3B and the light shielding film 4, the transparent flattening film 5 with the thickness of 2.5 μm is provided. With the transparent flattening film 5, the level difference of 0.2 μm regarding the color layers between the reflection part and the transmission part is eliminated. Thus, the flat surface (surface irregularity: ±0.03 μm or below) is obtained. The patterned transparent electrode 2A is provided on the surface of the transparent flattening film 5. In this way, the color filter substrate 6 is formed.

On the other hand, the counter substrate 8 provided with transparent electrodes 2B is so arranged as to oppose the color filter substrate 6. The sealing members 7 and the spacers 9 are provided between the color filter substrate 6 and the counter substrate 8, thus controlling the thickness of the liquid crystal layer. Although not shown in the drawing, orientation films are provided to the inner side surfaces of the color filter substrate 6 and the counter substrate 8. On the outer side surfaces of the color filter substrate 6 and the counter substrate 8, deflection plates 12 and 13 are provided, respectively. The deflection plate 12 is combined with a quarter-wave plate, and the deflection plate 13 is combined with a quarter-wave plate and a light diffusion film.

With regard to the thus structured semi-transmissive type color liquid crystal display device and the conventional semi-transmissive type color liquid crystal display device, Table 1 shows data comparison about color reproducibility and reflection brightness. For the conventional semi-transmissive type color liquid crystal display device, two display devices were prepared in which the metallic reflective film 11 had the thickness of 0.1 μm, and the film thickness of the color filters at both the reflection part and the transmission part was 0.6 μm (Conventional Example 1) and 0.9 μm (Conventional Example 2), respectively. That is to say, such display devices were used that the reflection part and the transmission part had the same color filter thickness, and the surface of the color filter substrate was flat. In addition, the conventional display devices had the same structure as that of Example 1 except for the metallic reflective film 11 and the color filter thickness. The color resists for red, green, and blue to be used were identical, which showed 30% color density NTSC ratio when having the thickness of 0.9 μm. Evaluation was performed by using the same backlight light source upon transmission and the same white color light source upon reflection, with a spectrophotometer (Minolta CS-1000) for measurement.

[Table 1] Comparison in Color Reproducibility and Reflection Brightness Between Semi-transmissive Color Liquid Crystal Display Device of the Present Invention and Conventional Semi-transmissive Color Liquid Crystal Display Device (1)

|  |  | Example 1 | Conventional Example 1 | Conventional Example 2 |
|---|---|---|---|---|
| CF substrate | Transmission NTSC ratio | 30% | 20% | 30% |
|  | Reflection NTSC ratio | 40% | 45% | 56% |
|  | Reflection brightness | 40% | 40% | 28% |
| Display device | Transmission NTSC ratio | 25% | 16% | 25% |
|  | Reflection NTSC ratio | 24% | 26% | 42% |
|  | Reflection brightness | 25% | 25% | 17% |

As shown in Table 1, in Example 1, the color reproducibility at the time of transmission in the display device was 25% in NTSC ratio, which was as high as Conventional Example 2, and also the color reproducibility at the time of reflection was 24% in NTSC ratio and the reflection brightness was 25%, which were as high as Conventional Example 1. That is, the color reproducibility at the time of transmission and the color reproducibility at the time of reflection were high and well balanced, and the reflection brightness was high as well.

Now, description will be made of a method of manufacturing a semi-transmissive type color liquid crystal device according to an embodiment of the present invention with reference to FIGS. 10A to 10F. FIG. 10A shows a state in which the metallic reflective film 11 made of an aluminum alloy is formed on the surface of the transparent substrate 1A by sputtering. The film thickness can be adjusted based on time duration for forming the film. In an inline type sputtering device of recent years, plural aluminum alloy material targets can be loaded. Therefore, even when the metallic reflection film used in the present invention has the thickness of about 0.5 μm, which is larger than the 0.1 μm-thick metallic reflection film used in the conventional semi-transmissive type color liquid crystal device, no large difference occurs in time period for forming the film. Thus, the reproducibility hardly changes.

Subsequently, the aluminum alloy reflective film 11 is partially removed in the display pixel element by a photolithography method and etching as shown in FIG. 8 to obtain such a structure as shown in FIG. 10B. The proportion and shape of removing the metallic reflective film 11 can be set arbitrarily. When the removing area is large, the area of the transmission part is increased, resulting in high display brightness upon transmission. In contrast, when the area to be removed is small, high display brightness upon reflection can be obtained. A metal used for the reflective film 11 may be aluminum alone having high reflectance, but in general, an aluminum alloy composed of about 5% of neodymium and about 95% of aluminum is used. The neodymium is mixed for enhancing chemical resistance without decreasing the reflectance. Each of the mix rates is represented in atomic concentration.

Following this, as shown in FIG. 10C, the light shielding film 4 was formed in a desired pattern on the surface of the metallic reflective film 11. The light shielding film 4 is prepared by dispersing and mixing fine carbon particles or titanium black in a transparent photosensitive resin, with the film thickness of 0.6 μm. After application of the transparent photosensitive resin by a spinner, patterning was performed by the photolithography method to form the light shielding film 4. Since the light shielding film 4 is provided on the 0.5 μm-thick metallic reflective film 11 that allows no light to transmit therethrough, even when the light shielding film 4 is as thin as 0.6 μm, there arises no problem regarding the light blocking property at all. Alternatively, after removing the metallic reflective film 11 under the light shielding film 4, a light shielding film having the film thickness of 1A μm may be provided on the substrate.

As shown in FIG. 10D, the red colored layers 3R are then formed on the pixel element. For the formation, a liquid red color resist adjusted to have the viscosity of 8 cp and composed of an organic solvent containing PGMEA as its main ingredient and having the boiling point of about 140° C., was applied by the spinner such that its film thickness on the metallic reflective film 11 became 0.6 μm. In order to sufficiently effect the flattening function of the liquid color resist, elapse of 5 minutes is waited before performing provisional drying, and then patterning was conducted by the photolithography method. At this time, the film thickness of the red colored layers 3R in the transmission part was 0.9 μm. In a similar manner, each of a liquid green color resist and a liquid blue color resist adjusted to have the viscosity of 8 cp and composed of an organic solvent containing PGMEA as its main ingredient was applied by the spinner such that its film thickness of the colored layer at the reflection part (on the metallic reflective film 11) became 0.6 μm. In this way, the colored layers 3G and 3B shown in FIG. 10E were formed, and the film thickness at the transmission part of the respective colors was 0.9 μm.

After that, the transparent flattening film 5 made of a thermosetting polymer resin is applied by the spinner to have the thickness of 2.5 μm, before being thermally set at 230° C. for 1 hour. On the surface of the transparent flattening film 5, the transparent conductive film was formed by sputtering to then form a transparent electrode 2A in a desired pattern by the photolithography method and the etching method. As a result, the color filter substrate shown in FIG. 10F is obtained. By combining the thus manufactured color filter substrate 6 and the counter substrate 8 with each other, the semi-transmissive type color liquid crystal display device of the present invention shown in FIG. 9 was obtained.

Here, the case where the transmission part was formed at the center of the display pixel element is described as an example. However, the reflection part (metallic reflective film) may be formed at the center of the display pixel element. In such a case, the light shielding film is provided in a part where the reflective film is not formed on the transparent surface (that is, the transmission part). Moreover, the number of the transmission part in one pixel element is not necessarily limited to one, and plural transmission parts each having a small area may be provided in one pixel element. In the case where the reflective film is provided, in FIGS. 7 to 9, the light shielding film is provided so as to surround one pixel element, but the light shielding film may not be provided in a part of the surrounding area. In FIG. 8, the light shielding film in a lateral direction is not provided but only the light shielding film in a vertical direction may be provided to form a stripe shaped color filter.

EXAMPLE 2

Next, Example 2 is described while referring to FIGS. 9 and 10A to 10F, similarly to Example 1. The fundamental structure is the same as that of Example 1, so that the manufacturing method is mainly described and the above-mentioned description will be omitted.

In Example 2, a silver alloy material was used for the metallic reflective film 11. The material is an alloy containing silver as its main ingredient and composed of about 3% of neodymium, about 1% of copper, and about 96% of silver. The neodymium and the copper are mixed for enhancing chemical resistance without decreasing the reflectance of silver. Each of the mixing ratios is represented in atomic concentration. As in Example 1, the silver alloy is formed into a film having the thickness of 0.4 $\mu$m by using the inline type sputtering device. After that, the metallic reflective film 11 is formed in a desired pattern by the photolithography method and the etching method (FIG. 10B). Then, the 0.5 $\mu$m-thick light shielding film 4 was formed in a desired pattern on the surface of the metallic reflective film 11 (FIG. 10C).

A color resist for each of red, green, and blue adjusted to have the viscosity of 10 cp and composed of an organic solvent, which showed 40% color density NTSC ratio when having the thickness of 0.8 $\mu$m, containing liquid carbitol acetate as its main ingredient and having the boiling point of about 180° C., was applied by the spinner such that its film thickness at the reflection part became 0.5 $\mu$m. Then, a time period before the color resist is dried was set to 7 minutes, and the colored layers 3R, 3G, and 3B were formed in succession (FIG. 10E). At this time, the film thickness of each of the colored layers at the transmission part was 0.8 $\mu$m. In a similar manner as in Example 1, by using the thus manufactured color filter substrate, the semi-transmissive type color liquid crystal display device was manufactured.

The thus structured semi-transmissive type color liquid crystal display device and the conventional semi-transmissive type color liquid crystal display device were compared for evaluation, and the results are shown in Table 2. For the conventional semi-transmissive type color liquid crystal display device, two display devices were prepared in which the metallic reflective film 11 each had the thickness of 0.1 $\mu$m, and the film thickness of the color filters at both the reflection part and the transmission part was 0.5 $\mu$m (Conventional Example 3) or 0.8 $\mu$m (Conventional Example 4), respectively.

[Table 2] Comparison in Color Reproducibility and Reflection Brightness Between Semi-transmissive Color Liquid Crystal Display Device of the Present Invention and Conventional Semi-transmissive Color Liquid Crystal Display Device (2)

|  |  | Example 2 | Conventional Example 3 | Conventional Example 4 |
|---|---|---|---|---|
| CF substrate | Transmission NTSC ratio | 40% | 25% | 40% |
|  | Reflection NTSC ratio | 52% | 52% | 63% |
|  | Reflection brightness | 36% | 36% | 27% |
| Display device | Transmission NTSC ratio | 34% | 20% | 34% |
|  | Reflection NTSC ratio | 32% | 32% | 38% |
|  | Reflection brightness | 23% | 23% | 16% |

As is apparent from Table 2, the results show that the color reproducibility and the reflection brightness at the time of both transmission and reflection were extremely well balanced as compared to Conventional Examples 3 and 4.

It should be noted here that the passive matrix semi-transmissive type color liquid crystal display device has been described in the above-mentioned example, but the case may also be applicable where an active element such as a TFT is provided to the counter substrate 8 or the color filter substrate 6. Another metal or its alloy other than the aluminum alloy and the silver alloy may also be applicable.

What is claimed is:

1. A color liquid-crystal display device, comprising:
    a color filter substrate having a metallic reflective film, colored layers, and a transparent electrode formed on a transparent substrate;
    a counter substrate having an opposite electrode that is opposite to the transparent electrode and constitutes a display pixel element with the transparent electrode; and
    a liquid crystal layer formed between the color filter substrate and the counter substrate, wherein:
    the metallic reflective film is formed in a part of an area of the display pixel element to establish a reflection part and a transmission part in the display pixel element;
    the colored layers are integrally formed on the metallic reflective film and at the transmission part where the metallic reflective film is not formed in the display pixel element; and
    a sum of a thickness of the metallic reflective film and a thickness of the colored layer on the metallic reflective film is larger than a thickness of the colored layer at the transmission part.

2. A color liquid crystal display device according to claim 1, wherein the sum of the thickness of the metallic reflective film and the thickness of the colored layer on the metallic reflective film is larger than the thickness of the colored layer at the transmission part by 0.15 $\mu$m to 0.30 $\mu$m.

3. A color liquid crystal display device according to claim 2, wherein a light shielding film is formed between the colored layers.

4. A color liquid crystal display device according to claim 3, wherein the light shielding film is provided on the metallic reflective film.

5. A color liquid crystal display device according to claim 3, wherein the light shielding film is formed on an area of the transparent substrate where the metallic reflective film is not formed.

* * * * *